E. A. STANLEY.
Securing Hubs to Axles.
No. 102,876. Patented May 10, 1870.
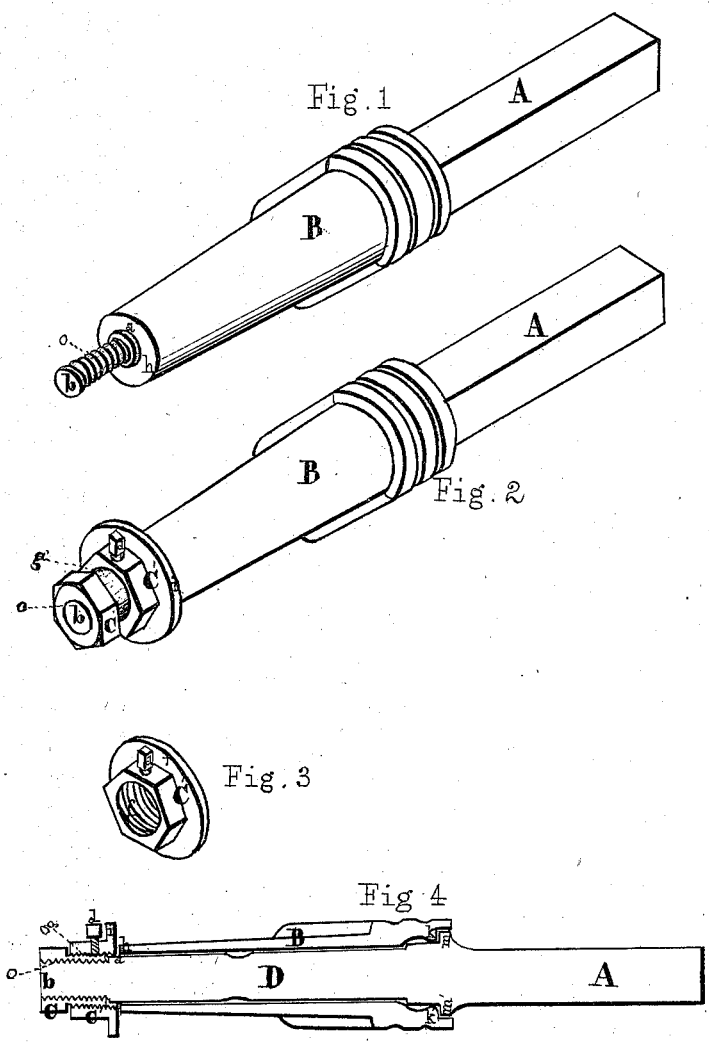

United States Patent Office.

EDGAR A. STANLEY, OF BREWER, MAINE, ASSIGNOR TO HIMSELF AND ORLANDO A. PALMER, OF SAME PLACE.

Letters Patent No. 102,876, dated May 10, 1870.

IMPROVEMENT IN AXLE-NUTS.

The Schedule referred to in these Letters Patent and making part of the same

*To all whom it may concern:*

Be it known that I, EDGAR A. STANLEY, of Brewer, in the county of Penobscot and State of Maine, have invented certain Improvements in Axle-Nuts; and I do declare that the following is a full and exact description thereof, reference being had to the accompanying drawings and to the letters of reference marked thereon.

The nature of my invention consists in so constructing the nut which secures the wheel on the axle, as to enable it to be extended at pleasure, and exactly graduated, so as to compensate for the wear on the end of the boxes.

In the accompanying drawings—

Figure 1 is a perspective view of the end of a carriage-axle, with the nut removed, showing the end of the box worn away at $h$, and the journal projecting beyond the box at $a$.

Figure 2 is a perspective view of the axle, with the box and nut in place, and showing the nut so extended against the box as to hold it still in its proper position.

Figure 3 is a perspective view of the part of the nut which acts as an extension, showing the screw-thread at $f$, which runs in the thread cut on the principal part of the nut C, and by which it is possible to produce the extension of the whole nut at will.

Figure 4 is a longitudinal sectional view of the axle A, box B, journal D, and nut C C'.

To enable others skilled in the art to make and use my invention, I will now proceed to describe its construction and operation.

I construct the axle A, and turn on the end of it the journal D, and provide the box B, all of which may be the same as in general use.

I construct the compound nut C C' in two parts, the part C having a female screw, which fits onto the male screw $b$, as seen at $o$.

I then turn down the part C, and cut an outside thread or male-screw, $g$, which fits the female screw $f$ in the part of the nut marked C', and enables the part C' to be moved to any desired distance forward or backward on the part C.

I construct the part C' with a flange, $i$, and provide a set-screw, $d$.

This set-screw is arranged to play in the part C', and, by pressing upon the thread of the male screw $g$, to hold the part C' at any desired point on the part C.

In this manner the part C' may be screwed up and follow the box B, as it wears away, and leaves a space at $h$.

When the part C' is set up to the box, and the set-screw brought to bear upon the thread $g$, the whole operates as one nut, and is handled and moved as an ordinary nut.

In operation this nut possesses several great advantages:

First, by care in keeping the part C' screwed up to bear against the box, the wheels may be run almost, if not quite, noiselessly.

Second, all wheels "talk" or "chatter," as it is termed, as soon as they become worn, and, by some good teamsters, this is considered a sign that the wheels run easy, while, in reality, it simply indicates that they are hung about right on the axle or journal, and do not hug against either nut or shoulder; but when there is play there is concussion, and this, added to friction, wears away the ends of the box much faster than they would wear with the friction alone.

Third, this nut saves much of the wear occasioned by grit and dust, because, being continually set up against the box, there cannot so much nor such coarse grit and dust get in to grind out the box, the nut, and the journal.

Fourth, it saves all concussive strain on the wheels, for, when there is the least play, the strain of the load commences with a sudden jar or concussion, which strains the wheel, and which is reduced to a steady strain by the use of this nut.

Fifth, the original cost of this nut is much less than the cost of the necessary repairs and patching up of the ordinary nut now in common use. As soon as the boxes begin to wear, it is found necessary to fill the space between the ordinary nut and the boxes, either with leather, or, in many cases, iron rings are riveted onto the face of the nut. The expense and trouble of either operation is more than the cost of the extension nut, and one or the other of these operations must be resorted to before the vehicle is half worn out. This cannot be remedied with the ordinary nut, as it must be made to screw up against the shoulder of the journal at $a$, and the shoulder cannot be left shorter than the box, because, in the first place, the moment the nut became dry, it would have a tendency to screw up against the box and bind; and, in the second place, the shoulder of the journal would wear into the box, and cause serious trouble in the running.

Sixth, this nut economizes the use of oil or anything used as a lubricator, because oil will not waste as rapidly when the nut is kept up against the box as when there is an open space at each end.

What I claim as my invention, and wish to secure by Letters Patent, is—

1. The combination of the outside part C', inside nut or part C, and set-screw $d$, to form a compound or extension nut.

2. The combination of the nut or part C', inside nut or part C, set-screw $d$, and axle-screw $b$ the two parts C and C' operating together by means of the male screw $g$ and the female screw $f$, substantially as and for the purpose hereinbefore set forth.

EDGAR A. STANLEY.

Witnesses:
JASPER HUTCHINGS,
FRED. H. COOMBS.